US012622543B2

(12) United States Patent     (10) Patent No.: US 12,622,543 B2

Redl     (45) Date of Patent: May 12, 2026

(54) BEVERAGE PREPARATION DEVICE WITH A WASHING MEANS

(71) Applicant: Redl GmbH, Hollabrunn (AT)

(72) Inventor: Hermann Redl, Hollabrunn (AT)

(73) Assignee: REDL GMBH (AT)

( * ) Notice: Subject to any disclaimer, the term of this patent is extended or adjusted under 35 U.S.C. 154(b) by 1137 days.

(21) Appl. No.: 17/628,423

(22) PCT Filed: Jul. 30, 2020

(86) PCT No.: PCT/EP2020/071476

§ 371 (c)(1),
(2) Date: Jan. 19, 2022

(87) PCT Pub. No.: WO2021/023611

PCT Pub. Date: Feb. 11, 2021

(65) Prior Publication Data

US 2022/0361709 A1     Nov. 17, 2022

(30) Foreign Application Priority Data

Aug. 2, 2019    (AT) ................................ A50696/2019

(51) Int. Cl.
   *B67D 1/07*       (2006.01)
   *A47J 31/60*      (2006.01)

(52) U.S. Cl.
   CPC ................ *A47J 31/60* (2013.01); *B67D 1/07* (2013.01); *B67D 2210/00047* (2013.01)

(58) Field of Classification Search
   CPC . A47J 31/60; B67D 1/07; B67D 2210/00047; B67D 1/0051; B67D 2210/0006
   See application file for complete search history.

(56) References Cited

U.S. PATENT DOCUMENTS 2,263,807 A * 11/1941 Hanson ............... A47L 15/0068
                             15/75
5,174,354 A * 12/1992 Neeser .................. B08B 9/0804
                            141/35
(Continued)

FOREIGN PATENT DOCUMENTS

DE      102015115418 A1    3/2017
EP         2364951 A2    9/2011
(Continued)

*Primary Examiner* — Tiffany T Tran

(74) *Attorney, Agent, or Firm* — NGUYEN TARBET IP LAW

(57) ABSTRACT

The invention relates to an appliance for the automated preparation of beverages, comprising a dispensing element (1), which comprises a plurality of dispensing openings (2) for dispensing individual beverage ingredients, and also comprising a washing device (3) for dispensing a washing fluid, wherein the washing device (3) is arranged in a retaining region (5) at a location remote from the dispensing element (1), wherein the washing device (3) can be removed from the retaining region (5), and wherein an accommodating region (4), which is designed to accommodate at least part of the washing device (3), is provided on the dispensing element (1), wherein a valve element (2) is provided, said valve element comprising a flushing-fluid inlet (23), an ingredients inlet (24) and a fluid outlet (25), which is connected to at least one dispensing opening (2), wherein the flushing-fluid inlet (23) opens out into a flushing-fluid channel and the ingredients inlet (24) opens out into an ingredients channel, and wherein the flushing-fluid channel and the ingredients channel come together to form a common fluid channel, which opens out into the fluid outlet (25).

17 Claims, 3 Drawing Sheets

(56)                  References Cited

U.S. PATENT DOCUMENTS

| | | | | |
|---|---|---|---|---|
| 5,601,101 | A  * | 2/1997 | Grapes ................. | B08B 9/0325 |
| | | | | 134/100.1 |
| 6,134,910 | A  * | 10/2000 | Sato ..................... | F25B 39/026 |
| | | | | 62/484 |
| 9,546,085 | B2 * | 1/2017 | Baron ................. | B67D 1/0889 |
| 2002/0043071 | A1 * | 4/2002 | Frank ....................... | A23G 9/20 |
| | | | | 62/135 |
| 2009/0293733 | A1 * | 12/2009 | Martin ................. | G07F 13/065 |
| | | | | 99/280 |
| 2011/0220159 | A1 * | 9/2011 | Ellickson ............ | B67D 1/0084 |
| | | | | 134/198 |
| 2012/0247513 | A1 | 10/2012 | Johnson | |
| 2013/0140328 | A1 | 6/2013 | Gates et al. | |
| 2017/0334703 | A1 * | 11/2017 | Hecht ................. | B67D 1/1477 |
| 2018/0111168 | A1 * | 4/2018 | Aneson .................. | B08B 9/027 |

FOREIGN PATENT DOCUMENTS

| | | | | |
|---|---|---|---|---|
| JP | 2006082822 A | 3/2006 | | |
| WO | WO-2016146718 A1 * | 9/2016 | ............ | B05B 15/55 |

* cited by examiner

BEVERAGE PREPARATION DEVICE WITH A WASHING MEANS

CROSS-REFERENCES TO RELATED APPLICATIONS

This application is a 371 and claims benefit of PCT Application No. PCT/EP2020/071476 filed Jul. 30, 2020, which claims benefit of Austrian Application No. A50696/2019 filed Aug. 2, 2019, the specification(s) of which is/are incorporated herein in their entirety by reference.

The invention relates to a device for the automated preparation of beverages with the features of the preamble of the independent patent claim.

Beverage preparation devices known in the art offer the possibility to prepare a plurality of mixed beverages in an automated manner. An arrangement of multiple dispensing openings is provided on a dispensing element, wherein a liquid ingredient for a mixed beverage can be conveyed into each dispensing opening. Such devices are particularly suitable for the preparation of cocktails, since such mixed beverages often comprise a large number of individual ingredients. With the aid of an automatic device, rapid preparation of the beverages and exact dosing of the ingredients are possible. The ingredients can be alcoholic beverages, such as spirits or liqueurs, non-alcoholic beverages, such as juices, syrups, water, mineral water, as well as other liquid ingredients, such as milk or cream.

Such preparation devices inherently have a plurality of tubes, outlets, and other liquid-carrying elements. If a device is taken out of service overnight or for an extended period of time, the problem arises that ingredients may remain in the feed lines and the dispensing openings.

On the one hand, this presents hygienic challenges, especially for perishable ingredients such as dairy products, and on the other hand, it can easily lead to clogging of feed lines and/or dispensing openings, in particular for ingredients with high sugar content.

Therefore, the need arises to clean the preparation device after operation, which can be very labor-intensive. The time saved by using the preparation device is reduced again by the time-consuming cleaning work.

Now, an object of the present invention is to reduce or completely overcome the above mentioned disadvantages of the state of the art.

The object of the invention is solved by the characterizing features of the independent patent claim.

The invention relates to a device for the automated preparation of beverages, comprising a dispensing element, which comprises a plurality of dispensing openings for dispensing individual beverage ingredients, and a washing means for dispensing a rinsing liquid, wherein the washing means is arranged in a holding area at a distance from the dispensing element.

According to the invention, it is provided that the washing means can be removed from the holding area, and that a receiving area is provided on the dispensing element, which is designed to at least partially receive the washing means.

This allows the washing means, when located in the holding area, to be used for washing drinking vessels, and in the receiving area, for rinsing the dispensing element. This enables at least the washing of the outer parts of the dispensing element and in particular the individual dispensing openings. Thus, a quick and easy basic cleaning of the dispensing element is possible, whereby this washing means can be used for two washing tasks.

Optionally, it may be provided that the washing means comprises a mechanically and/or electronically actuated outlet valve, in particular a rotary valve, for dispensing the rinsing liquid. The outlet valve may be a pressure valve or a magnetic valve, for example. This enables a particularly good cleaning effect of the washing means. If a washing step is to be carried out, the washing means need only be pressed manually against the dispensing element.

Optionally, it may be provided that the receiving area is substantially circular and that the washing means comprises a projecting, substantially circular edge element, which is designed for being inserted into the receiving area.

This enables a simple connection between the receiving area and the washing means. In particular, the cooperation of the edge element and the receiving area can prevent uncontrolled splashing of the rinsing liquid.

Optionally, it may be provided that a first sealing element surrounding the edge element is arranged on the free end of the edge element. This enables a liquid-tight connection between the washing means and the dispensing element. In addition to reducing soiling by spraying rinsing liquid, the washing performance can be improved, as the rinsing liquid can be conveyed in the direction of the dispensing element.

Optionally, it may be provided that a magnetic holding element is arranged in the receiving area of the dispensing element, the holding element being designed to cooperate with at least part of the washing means, in particular with the edge element, or that a magnetic holding element is arranged on the washing means, in particular on the edge element, the holding element being designed to cooperate with at least part of the receiving area of the dispensing element.

This enables a releasable mounting of the washing means on the receiving area and a particularly simplified adjustment of the same.

Preferably, the magnetic holding element is designed as a magnetic ring. Alternatively, the magnetic holding element may also be designed as a circular arrangement of multiple individual magnets.

The respective opposite side may comprise a magnetic element adapted to interact with the magnetic holding element. The magnetic element may comprise or consist of a magnetic or a ferromagnetic material.

Optionally, it may be provided that a substantially circular second sealing element is arranged in the receiving area. This may further improve the seal effect. In particular, it may be provided that the first sealing element and the second sealing element rest against each other in the intended use of the device.

Optionally, it may be provided that the second sealing element is arranged between the magnetic holding element and the edge element of the washing means when the washing means is arranged on the receiving area of the dispensing element.

This may ensure that the washing means is always placed on the dispensing element such that a seal effect occurs. In this way, a sufficient seal effect can be ensured even in the case of an inaccurate alignment of the two elements, as the washing means is brought into the correct position by the magnetic effect.

Optionally, it may be provided that the receiving area is bounded by an outer wall. This may further increase the protective effect against uncontrolled spraying.

Preferably, it is provided that the outer wall has a rounding or bevel on its inner circumference. This enables an easy insertion of the washing means into the receiving area. The bevel or rounding acts as a guide element when approaching the washing means.

Optionally, it may be provided that an outlet channel is provided in the dispensing element and/or in the washing means for discharging excess rinsing liquid via an outlet opening.

Optionally, it may be provided that the washing means is movably arranged in the holding area and is designed to dispense the rinsing liquid when it is arranged in the holding area and is vertically displaced relative to the holding area. This may in particular ensure the function of discharging the rinsing liquid when a liquid container is pressed against the washing means from above.

Optionally, it may be provided that the outlet valve is designed in the form of a rotary nozzle. This improves the cleaning effect since the rinsing liquid can directly hit each point on the dispensing element.

Optionally, it may be provided that a double hose with an inner hose and an outer hose is arranged on the outlet opening, the inner hose being designed to provide the rinsing liquid and the outer hose being designed to discharge the rinsing liquid. The inner hose and the outer hose may be connected to an external rinsing liquid supply and liquid drainage, which may be arranged inside the beverage preparation device itself or outside it.

Optionally, it may be provided that at least one, preferably two opposite, magnetic reed contacts, which are connected to a control unit, are provided in the receiving area of the dispensing element, which are designed to cooperate with at least part of the washing means, in particular with the edge element, in order to indicate to the control unit the complete coupling of the washing means with the receiving area.

For example, a light signal, such as an LED, may be displayed when a sufficient contact is made. It may also be provided that the dispensing of rinsing liquid is only possible once the contact has been made. This may prevent the unintentional dispensing of rinsing liquid. In particular, the dispensing as well as the intensity and duration of the dispensing of the rinsing liquid may be controlled by the control unit.

According to the invention, it is provided that a valve element is provided, which comprises a rinsing liquid inlet, an ingredient inlet and a liquid outlet that is connected to at least one dispensing opening.

The rinsing liquid inlet opens into a rinsing liquid channel and the ingredient inlet opens into an ingredient channel. The rinsing liquid channel and the ingredient channel converge to a common liquid channel, which opens into the liquid outlet.

Preferably, a valve, in particular a non-return valve, is provided in the ingredient channel, which enables a liquid flow only from the ingredient inlet towards the liquid outlet. Preferably, a valve, in particular a non-return valve, is provided in the rinsing liquid channel, which enables a liquid flow only from the rinsing liquid inlet towards the liquid outlet.

The ingredient inlet may optionally be connected to pumps for delivering ingredients.

Optionally, it is provided that the valve element comprises a first valve, wherein the first valve is arranged such that, in a first valve position, the flow of liquid between the rinsing liquid inlet and the liquid outlet is or can be prevented, and such that, in a second valve position, the flow of liquid between the rinsing liquid inlet and the liquid outlet is or can be enabled.

Optionally, it is provided that the valve element is connected to the control unit, and that the control unit is designed to change the valve position of the valve element when the washing means is completely coupled with the receiving area, in particular to move the valve element into the second valve position. In particular, the first valve may be a magnetic valve.

Optionally, it is provided that the valve element has an inlet and an outlet in order to supply and discharge cooling liquid.

Optionally, a valve element comprises multiple ingredient inlets, each of which may be connected to its own liquid outlet.

Preferably, the rinsing liquid is plain water, such as tap water. In particular, the device according to the invention may be used for rough daily cleaning of a beverage preparation device. Basic cleaning is usually performed manually at longer intervals.

Optionally, a first supply hose and a second supply hose can be connected to the washing means so that different rinsing liquids, for example cold water and hot water, can be used.

Optionally, the control device may be configured to select the respective supply hose. A selection may be made either manually or automatically based on the position of the washing means.

Optionally, it is provided that at least one, preferably two opposite, sensor elements are provided in the receiving area of the dispensing element, which are designed to cooperate with at least part of the washing means, in particular with the edge element, to indicate to a control unit the complete coupling of the washing means with the receiving area.

The sensor element(s) may be designed as (a) magnetic reed contact(s).

Optionally, the sensor element(s) may alternatively by designed in the form of another suitable sensors capable of detecting the arrangement of the washing means on the receiving area, for example as an optical sensor.

The use of sensor elements in conjunction with the control unit can be particularly advantageous if different rinsing functions are to be used depending on the position of the washing means.

Optionally, it is provided that the control unit is designed to control the temperature of the rinsing liquid fed to the washing means and/or to supply rinsing liquid of different temperatures to the washing means depending on the position of the washing means.

Optionally, it is provided that the control unit is designed to supply rinsing liquid with a temperature between 5° C. and 30° C. to the washing means when the washing means is coupled with the receiving area. Optionally, this temperature is between 15° C. and 30° C. Optionally, it is provided that the control unit is designed to supply the washing means with rinsing liquid at a temperature of more than 40° C. when the washing means is arranged at a distance from the receiving area. Optionally, this temperature is above 50° C. or above 60° C.

Thus, depending on the position of the washing means, the temperature of the rinsing liquid can be adjusted. In particular, the dispensing element can be rinsed with warm or hot water to effectively remove sugary beverage residues. If the washing means is not coupled with the dispensing area, cold water can be dispensed, for example, to allow glasses to be rinsed before use.

Optionally, a first rinsing liquid supply line and a second rinsing liquid supply line may be connected to the washing means, the two rinsing liquid supply lines being able to provide rinsing liquids of different temperatures.

Further features of the invention arise from the patent claims, the figures and the exemplary embodiment.

In the following, the invention is explained in detail by means of an exemplary embodiment. The exemplary embodiment merely illustrates the invention and is not intended to limit the scope of protection. In the figures:

FIG. 4b shows a sectional view of the valve element of FIG. 4a.

FIG. 1 shows a schematic lateral sectional view of an arrangement of a washing means 3 on a dispensing element 1 according to an exemplary embodiment of the present invention. For simplicity, the other elements included in a beverage preparation device are not shown in FIG. 1.

Figure 1:
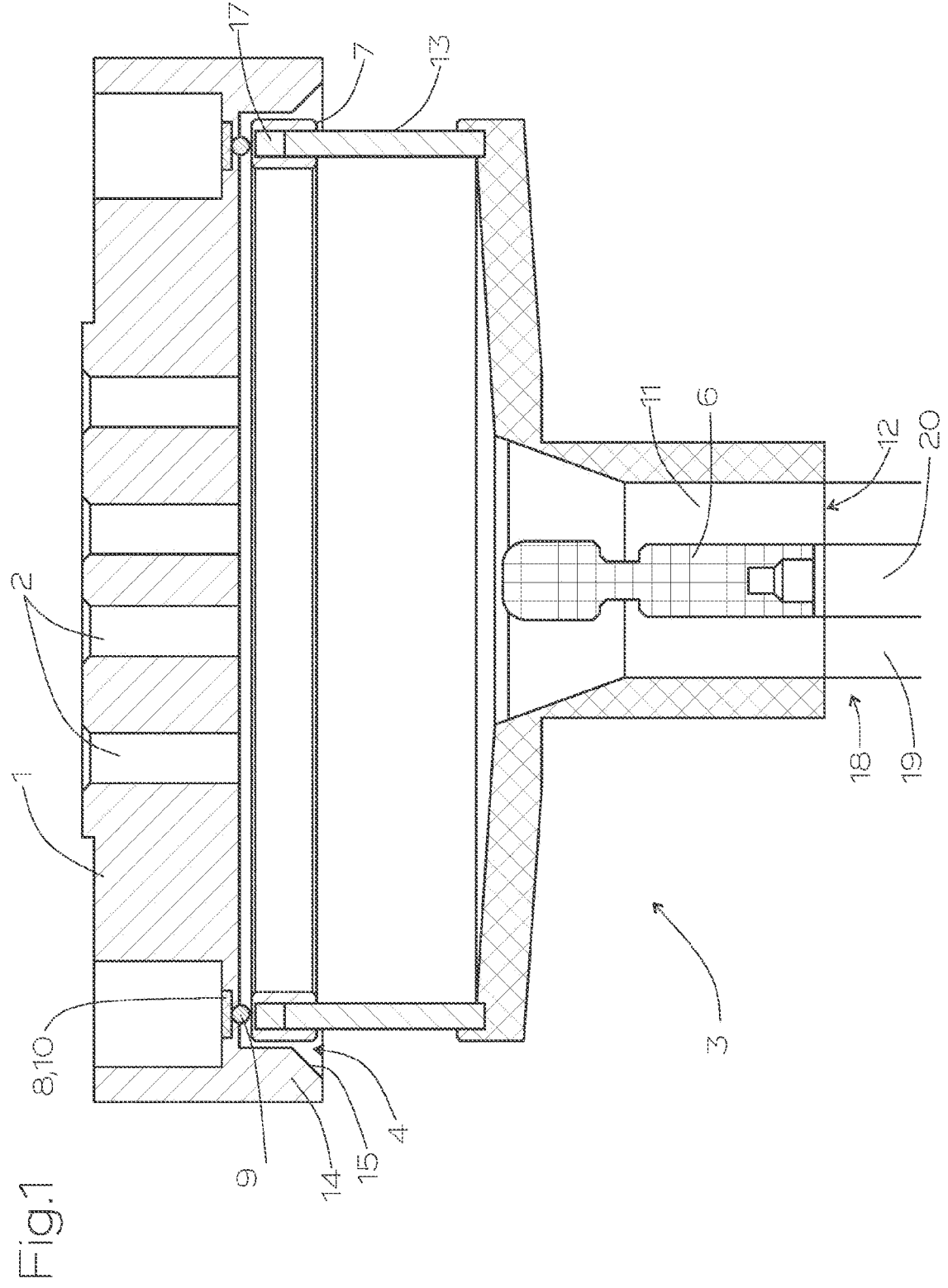
FIG. 1 shows a schematic lateral sectional view of an arrangement of a washing means on a dispensing element.

In FIG. 1, the washing means 3 is arranged on the dispensing element 1 of the device according to the invention. In this position, the dispensing element 1 can be cleaned. The dispensing element 1 comprises a plurality of dispensing openings 2, which are connected to individual ingredient containers (not shown) via lines.

The dispensing element 1 has a radially circumferential outer wall 14 with a bevel 15 on its inner surface. The bevel 15 serves the easier insertion of the washing means 3.

Figure 3:
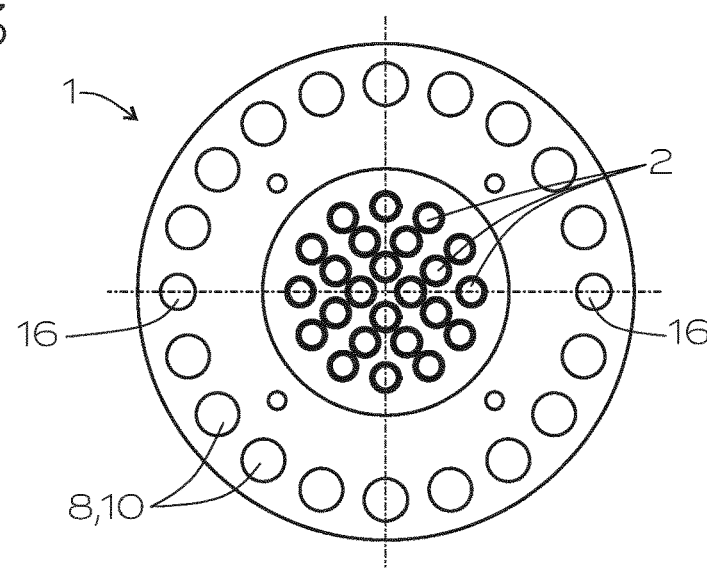
FIG. 3 shows a schematic view of the dispensing element from above.

The outer wall 14 surrounds the receiving area 4, wherein a circular holding element 8 is arranged in the receiving area 4. In this exemplary embodiment, the holding element 8 is designed as circular arrangement of multiple magnets 10, as shown in FIG. 3, which is described in detail below.

Between the holding element 8 and the washing means 3, a second sealing element 9 is arranged, which is designed in the form of a circular seal ring.

The washing means 3 according to the exemplary embodiment shown here comprises a circular edge element 13, which projects from the washing means 3. The edge element 13 has a free end, on which a first sealing element 7 is arranged. The first sealing element 7 surrounds the free end of the edge element 13 completely and is of substantially U-shaped design.

On its free end, the edge element 13 has a magnetic element 17, which in this exemplary embodiment is formed as a steel ring. The magnetic element 17 is located under the first sealing element. In other exemplary embodiments, the magnetic element 17 may be of any other design, as long as it is able to interact with the magnets 10 of the holding element 8. Preferably, the magnetic element 17 is made of or comprises a magnetic or ferromagnetic material.

The washing means 3 comprises an outlet valve 6 for dispensing rinsing liquid. In this exemplary embodiment, the rinsing liquid is tap water, but it may alternatively be water with a cleansing additive, such as a detergent.

An outlet channel 11 is arranged in the area of the outlet valve 6, which is designed for discharging the rinsing liquid. The rinsing liquid may be discharged via the outlet channel 11 and the subsequent outlet opening 12. On the outlet opening 12, a double hose 18 is arranged, which comprises an inner hose 19 and an outer hose 20. The inner hose 19 serves the supply of rinsing liquid, while the outer hose 20 serves its discharge.

Figure 2:
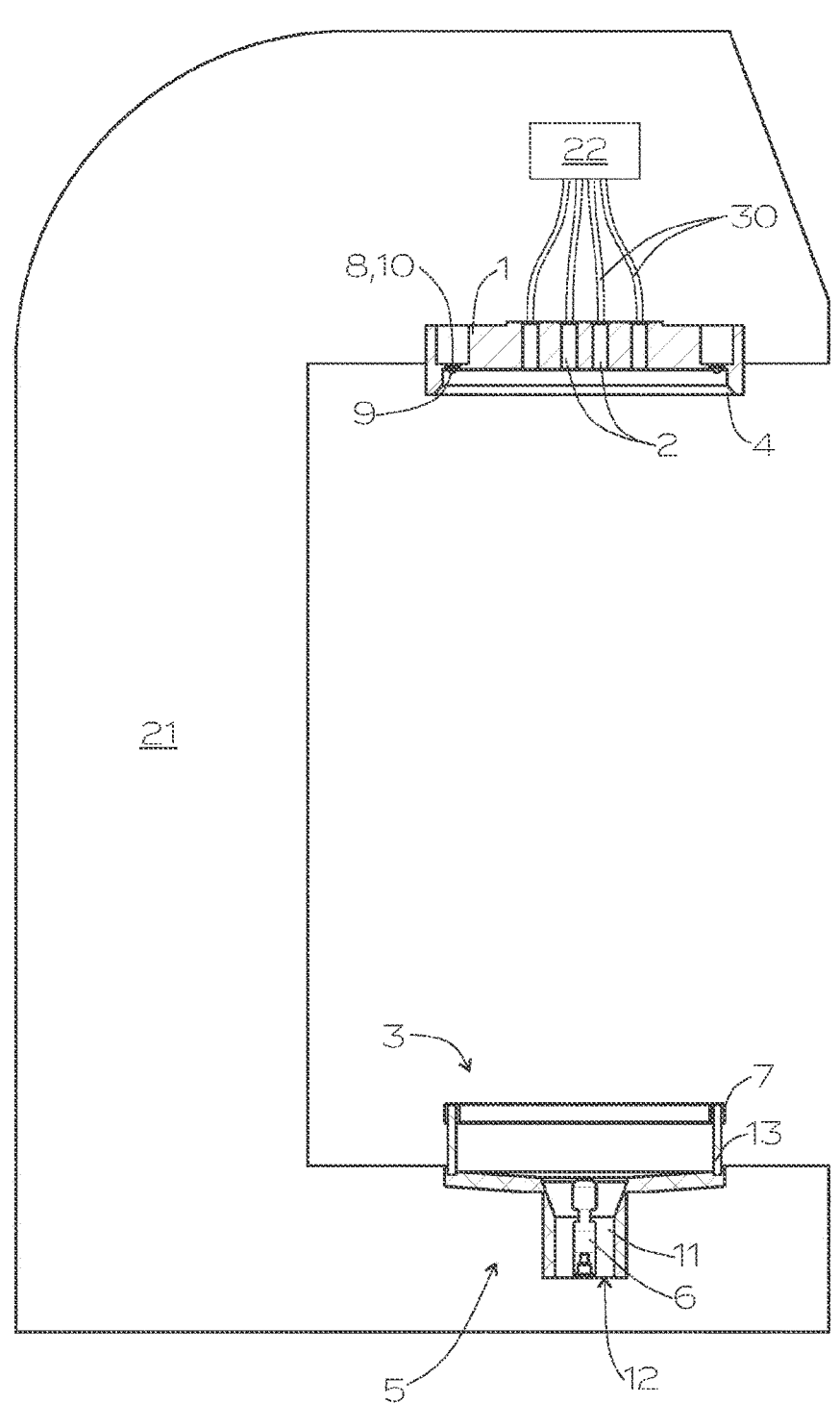
FIG. 2 shows a schematic lateral sectional view of a device according to the invention.

FIG. 2 shows a schematic lateral sectional view of an inventive device according to the exemplary embodiment. In contrast to FIG. 1, the dispensing element 1 and the washing means 3 are arranged at a distance from one another in this view; the washing means 3 is positioned in the holding area 5 at a distance from the dispensing element 1. The features of the dispensing element 1 and the washing means 3 are not explained again here and correspond to those described in connection with FIG. 1. Additionally, the housing 21 of the device is shown, in which control devices, connecting hoses and other means are arranged. Here, these means are not shown for convenience, but it is obvious to a person skilled in the art what means and elements may be involved. The respectively used means have no influence whatsoever on the effect of the invention and can be chosen at will within the scope of general expert knowledge.

Figure 4A:
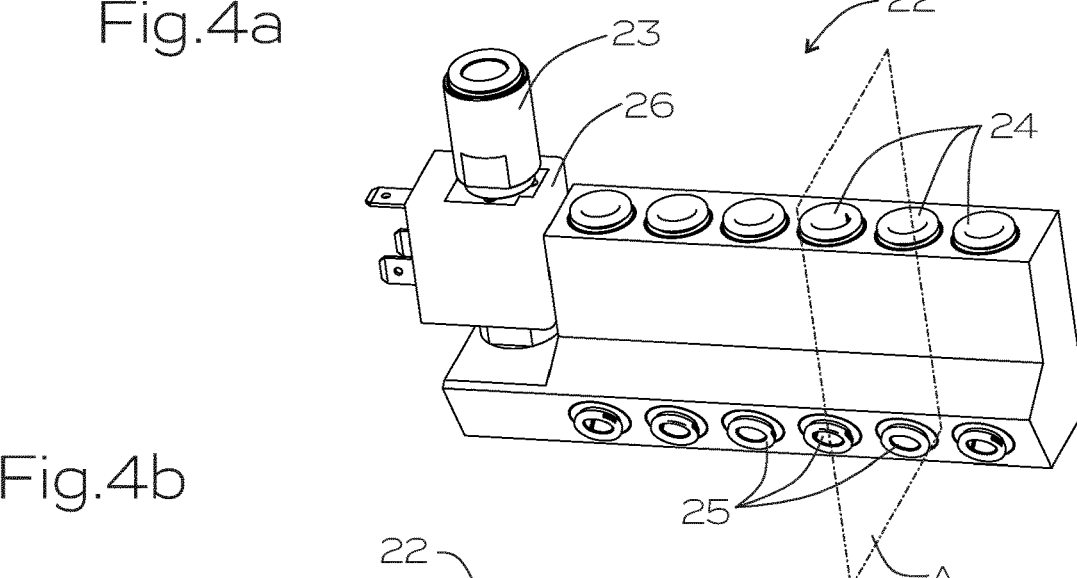
FIG. 4a shows a perspective view of a valve element for use with a device according to the invention.
Figure 4B:
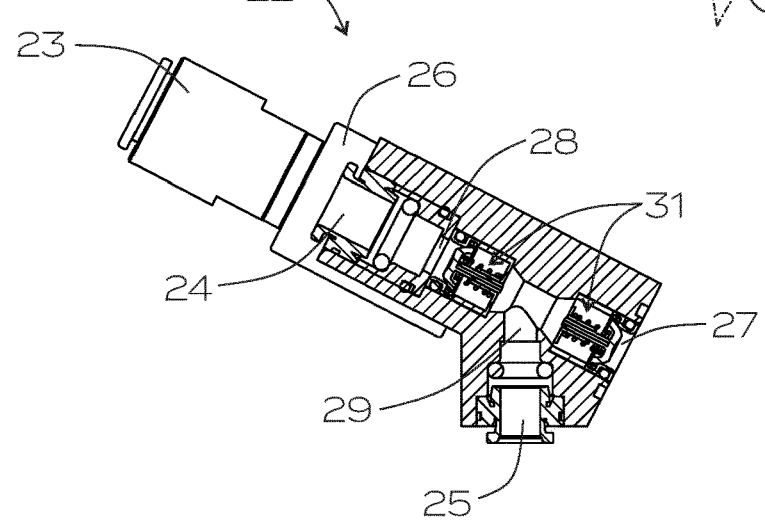

Via hoses 30, each dispensing opening 2 is connected to a valve element 22, which is shown in detail in FIG. 4a and FIG. 4b. The valve element 22 is used to supply ingredients and rinsing liquid to clean the dispensing openings 2 from the inside. The device of this exemplary embodiment comprises four valve elements 22, which are not shown individually in FIG. 1.

FIG. 3 shows a schematic view of the dispensing element 1. The circular outer wall 14 with its bevel 15 surrounds the dispensing element 1. In the central area of the dispensing element 1, dispensing openings 2 are arranged, each of which is designed to dispense one ingredient for a mixed beverage. In the outer area of the dispensing element 1, the holding element 8 is arranged, which is formed from a plurality of magnets 10 arranged in a circle. The holding element 8 is designed to interact with the edge element 13, in particular with the magnetic element 17, of the washing means 3, as already explained in detail above.

In the outer area of the dispensing element 1, two reed contacts 16 are further arranged, which are designed to detect whether the washing means 3 is positioned on the dispensing element 1. In this exemplary embodiment, the control device of the device according to the invention does not enable the dispensing of rinsing liquid until the washing means 3 is correctly arranged.

FIG. 4a shows a perspective view of a valve element 22 for use with a device according to the invention, while FIG. 4b shows a sectional view of the valve element of FIG. 4a along sectional plane A.

The valve element comprises six ingredient inlets 24, six liquid outlets 25 and a rinsing liquid inlet 23. The ingredient inlets 24 are connected via hose lines, which are not shown, to supply devices, for example pumps, for supplying liquid beverage ingredients. Each liquid outlet 25 is connected to a dispensing opening 2 of the dispensing element 1 via a separate hose 30. The rinsing liquid inlet 23 is connected to a rinsing liquid supply via a hose, which is not shown.

Inside the valve element 22, each ingredient inlet 24 opens into an ingredient channel 28 and the rinsing liquid inlet 23 opens into a rinsing liquid channel 27. The rinsing liquid channel 27 joins each ingredient channel 28 to form a separate liquid channel 29, which terminates in the liquid outlet 25. This allows simultaneous rinsing of each dispensing opening 2 with rinsing liquid.

The supply of rinsing liquid is controlled by a first valve 26, which is preferably connected to the control device.

A non-return valve 31 is arranged in each of the ingredient channel 28 and the rinsing liquid channel 27 upstream of the confluence of the ingredient channel 28 and the rinsing liquid channel 27. These two non-return valves 31 are positioned so that an ingredient flowing through the ingredient channel 28 cannot enter the rinsing liquid channel 27. Conversely, the rinsing liquid flowing through the rinsing liquid channel 27 cannot enter the ingredient channel 28.

Thus, both ingredients and rinsing liquid can only exit through the dispensing opening 2 and cannot enter other areas.

The device according to the invention comprises four valve elements 22, since twenty-four dispensing openings 2 are provided, each coupled with its own ingredient inlet 24.

LIST OF REFERENCE SIGNS 1 dispensing element
2 dispensing opening
3 washing means
4 receiving area
5 holding area
6 outlet valve
7 first sealing element
8 holding element
9 second sealing element
10 magnet
11 outlet channel
12 outlet opening
13 edge element
14 outer wall
15 bevel
16 reed contact
17 magnetic element
18 double hose
19 inner hose
20 outer hose
21 housing
22 valve element
23 rinsing liquid inlet
24 ingredient inlet
25 liquid outlet
26 first valve
27 rinsing liquid channel
28 ingredient channel
29 liquid channel
30 hose
31 non-return valve

The invention claimed is:

1. A device for the automated preparation of beverages, comprising a dispensing element (1), which comprises a plurality of dispensing openings (2) for dispensing individual beverage ingredients, and a washing means (3) for dispensing a rinsing liquid, wherein the washing means (3) is arranged in a holding area (5) at a distance from the dispensing element (1), wherein the washing means (3) is removable from the holding area (5), and wherein a receiving area (4) is provided on the dispensing element (1), which is designed for at least partially receiving the washing means (3), characterized in that a valve element (22) is provided, which comprises a rinsing liquid inlet (23), an ingredient inlet (24) and a liquid outlet (25), which is connected to at least one dispensing opening (2), wherein the rinsing liquid inlet (23) opens into a rinsing liquid channel and the ingredient inlet (24) opens into an ingredient channel, and wherein the rinsing liquid channel and the ingredient channel converge to a common liquid channel, which opens into the liquid outlet (25), wherein the washing means (3) comprises a mechanically or electronically actuated outlet valve (6), for the rinsing liquid, configured to, upon actuation, enable flow of a rinsing liquid through only the rinsing liquid inlet (23) to the liquid outlet (25).

2. The device according to claim 1, characterized in that the receiving area (4) is substantially circular and in that the washing means (3) comprises a projecting, substantially circular edge element (13), which is designed for being inserted into the receiving area (4).

3. The device according to claim 2, characterized in that a first sealing element (7) surrounding the edge element (13) is arranged on the free end of the edge element (13).

4. The device according to claim 3, characterized
in that a magnetic holding element (8) is arranged in the receiving area (4) of the dispensing element (1), the magnetic holding element being designed to cooperate with at least part of the washing means (3), or
in that a magnetic holding element (8) is arranged on the washing means (3), the holding element being designed to cooperate with at least part of the receiving area (4) of the dispensing element (1).

5. The device according to claim 4, characterized in that the magnetic holding element (8) is designed as a magnetic ring or as circular arrangement of multiple magnets (10).

6. The device according to claim 5, characterized in that a substantially circular second sealing element (9) is arranged in the receiving area (4).

7. The device according to claim 6, characterized in that the second sealing element (9) is arranged between the magnetic holding element (8) and the edge element (13) of the washing means (3) when the washing means (3) is arranged on the receiving area (4) of the dispensing element (1).

8. The device according to claim 1, characterized in that the receiving area (4) is bounded by an outer wall (14).

9. The device according to claim 8, characterized in that the outer wall (14) has a rounding or bevel (15) on an inner circumference of the outer wall (14).

10. The device according to claim 1, characterized in that an outlet channel (11) is provided in the washing means (3) for discharging excess rinsing liquid via an outlet opening (12).

11. The device according to claim 10, characterized in that a double hose (18) with an inner hose (19) and an outer hose (20) is arranged on the outlet opening (12), the inner hose (19) being designed to provide the rinsing liquid and the outer hose (20) being designed to discharge the rinsing liquid.

12. The device according to claim 1, characterized in that the washing means (3) is movably arranged in the holding area (5) and is designed to dispense the rinsing liquid when the washing means (3) is arranged in the holding area (5) and is vertically displaced relative to the holding area (5).

13. The device according to claim 1, characterized in that the outlet valve (6) is designed in the form of a rotary nozzle.

14. The device according to claim 1, characterized in that at least one sensor element are provided in the receiving area (4) of the dispensing element (1), which are designed to cooperate with at least part of the washing means (3) in order to indicate to a control unit the complete coupling of the washing means (3) with the receiving area (4).

15. The device according to claim 14, characterized in that the sensor element is designed as a magnetic reed contact (16).

16. The device according to claim 1, characterized in that the valve element (22) comprises a first valve (26), the first valve (26) being arranged such that,
in a first valve position, the flow of liquid between the rinsing liquid inlet (23) and the liquid outlet (25) is or can be prevented, and, in a second valve position, the flow of liquid between the rinsing liquid inlet (23) and the liquid outlet (25) is or can be enabled.

17. The device according to claim 1, characterized in that the valve element (22) has a cooling inlet and a cooling outlet in order to supply and discharge cooling liquid.

\* \* \* \* \*